United States Patent [19]

Heim

[11] 4,189,938
[45] Feb. 26, 1980

[54] DOUBLE TRACER GAS PROCESS FOR LOCATING CONDUIT LEAKS

[75] Inventor: Paul M. Heim, Franklin, Mass.

[73] Assignee: Heath Consultants, Incorporated, Stoughton, Mass.

[21] Appl. No.: 969,284

[22] Filed: Dec. 13, 1978

[51] Int. Cl.² .................................................. G01M 3/22
[52] U.S. Cl. ...................................................... 73/40.7
[58] Field of Search ............................ 73/40.7, 40.5 R

[56] References Cited

U.S. PATENT DOCUMENTS

| | | | |
|---|---|---|---|
| 2,486,199 | 10/1949 | Nier ........................................ | 73/40.7 |
| 2,928,247 | 3/1960 | Hubbell ............................ | 73/40.5 R X |
| 2,996,661 | 8/1961 | Roberts ................................ | 73/40.7 X |
| 3,036,457 | 5/1962 | Wood et al. ........................ | 73/40.7 X |
| 3,085,423 | 4/1963 | Champion ........................... | 73/40.7 X |
| 3,106,089 | 10/1963 | Scott et al. ......................... | 73/40.7 X |

FOREIGN PATENT DOCUMENTS

| | | | |
|---|---|---|---|
| 2329549 | 1/1975 | Fed. Rep. of Germany ............ | 73/40.7 |
| 2317649 | 2/1977 | France ....................................... | 73/40.7 |

Primary Examiner—Gerald Goldberg
Assistant Examiner—Joseph W. Roskos
Attorney, Agent, or Firm—Robert G. Mentag

[57] ABSTRACT

A process for locating leaks in an underground protective conduit disposed about a carrier pipe, and comprising the insertion of a double tracer gas into the protective conduit for the purpose of detecting leaks in the protective conduit. The process comprises the use of a double tracer gas which includes about two and one-half (2½) to ten (10) percent methane and about ninety (90) to ninety-seven and one-half (97½) percent argon.

3 Claims, 2 Drawing Figures

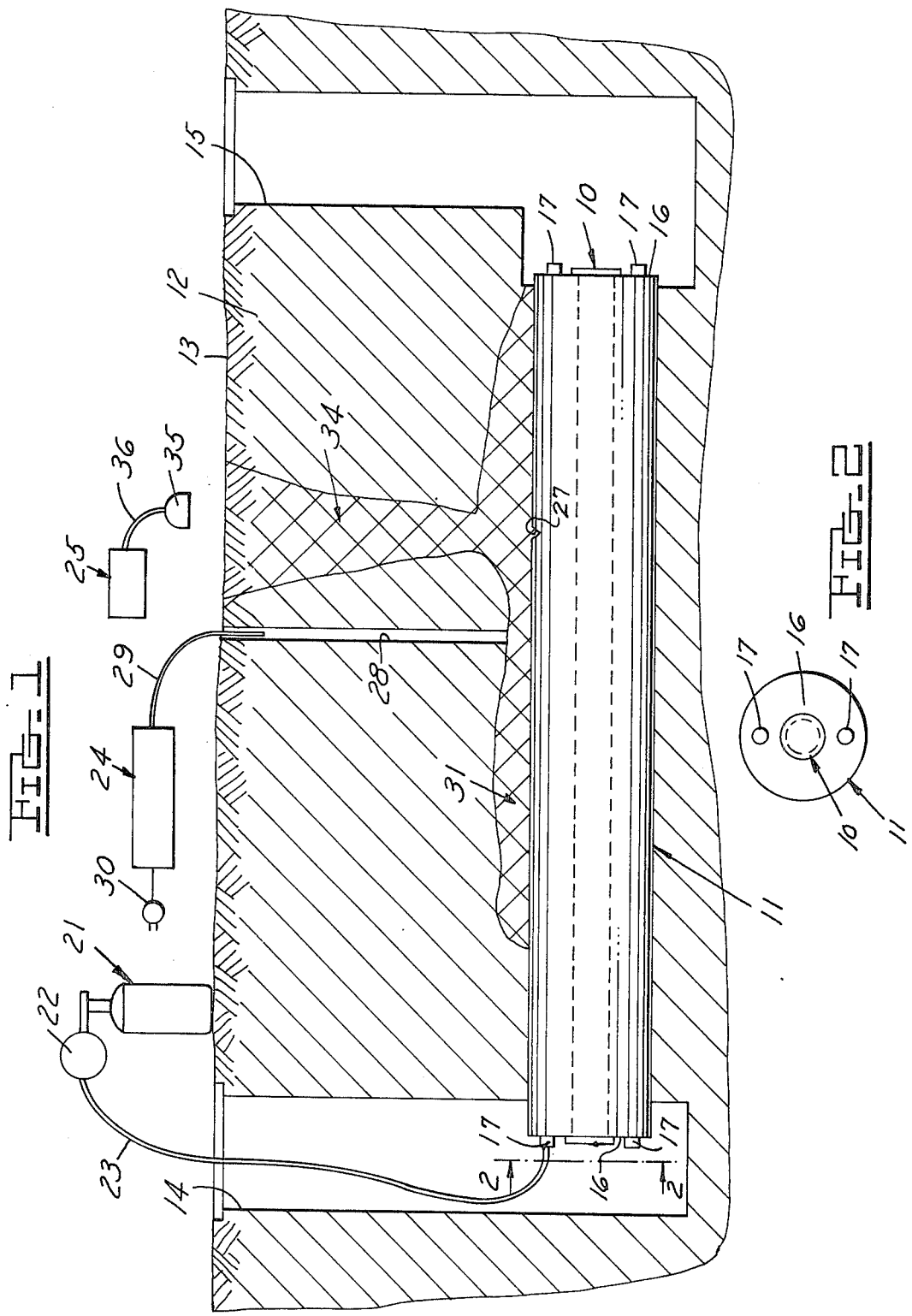

DOUBLE TRACER GAS PROCESS FOR LOCATING CONDUIT LEAKS

BACKGROUND OF THE INVENTION

1. Field of the Invention

This invention relates generally to the art of detecting leaks in fluid flow systems, and more particularly to a double tracer gas process for detecting leakages in underground conduit type piping systems.

2. Description of the Prior Art

It is known in the art of detecting leaks in fluid flow systems to employ a tracer gas for detecting leakages in underground conduit type piping systems. Steam, high temperature hot water, chilled water, hot oil and other products are frequently piped through underground conduit type piping syetems. These systems comprise a carrier pipe which is surrounded by a protective conduit. Insulating material may be disposed around the carrier pipe and inside of the protective conduit. The protective conduit also provides an insulating space between the carrier pipe and the surrounding earth. Any failure of the protective conduit which allows ground water to enter the protective conduit destroys the insulating qualities of the piping system and creates a corrosive atmosphere in the protective conduit which could lead to failure of the carrier pipe. Accordingly, periodic pressure tests of the protective conduit are desirable to determine the presence of leaks. If the leaks are detected by a drop in pressure, a means of pinpointing these leaks is necessary.

Heretofore, leaks in the aforementioned protective conduits were detected by introducing materials such as peppermint or mercaptan with high odor levels into the protective conduit. This practice resulted in the detection of only very large leaks. Heretofore, various single tracer gases were also used, such as helium or Freon, and some success has been achieved with such tracer gases. However, interfering gases in the soil, such as carbon dioxide, have resulted in confusion and missed leaks when single tracer gases such as helium or Freon are employed. Examples of prior art patents showing the use of prior art tracer gases are U.S. Pat. Nos. 2,486,199, 2,928,247, 2,996,661, 3,036,457, 3,085,423, and 3,106,089.

SUMMARY OF THE INVENTION

This invention relates to the art of detecting leaks in fluid flow systems, and more particularly to a double tracer gas process for detecting leakages in underground conduit type piping systems. Underground type piping systems include a carrier pipe for carrying steam, high temperature hot water, chilled water, hot oil and other products. The conduit pipe is provided with exterior insulation and a protective conduit is mounted around the carrier pipe so as to provide an insulating air space between the carrier pipe and the surrounding earth. The double tracer process of the present invention comprises the insertion of a tracer gas comprising the mixture or combination of about two and one-half (2½) to ten (10) percent methane and about ninety (90) to ninety-seven and one-half (97½) percent argon in the protective conduit in an access point as, for example, from a man hole access point. Methane is a lighter than air hydrocarbon, and it will rise to the surface and vent to the atmosphere. Accordingly, it is easily detected with portable flame ionization equipment. Flame ionization detectors detect only hydrocarbons and have the capability of showing a full meter deflection in the presence of 10 parts of methane in one million parts of air, so that very small leaks may be detected. Flame ionization detectors have multiple ranges of sensitivity and may be desensitized to evaluate larger leaks.

Argon is heavier than air gas which can be detected with suitable instruments, such as a "GAS-A-PHON". A test hole is bored into the ground over the conduit type piping system under test, and samples of the sub-surface atmosphere in the test hole are drawn into the "GAS-A-PHON" by a suitable hose. The "GAS-A-PHON" has two chambers with a speaker, as well as a microphone at each end of the chamber. A tone is generated by the speakers, and said tone is picked up by the microphone and the speed of sound transmission is monitored. One chamber is filled with air at atmospheric pressure, and the other chamber is filled with a sample of the sub-surface atmosphere drawn from the test hole. If argon is present in the sub-surface atmosphere in the test hole in the area of the conduit. a reading will be noted on the instrument. As the heavier than air argon is slow, the transmission of the tone in the test chamber can cause an imbalance in the detector circuit.

The presence of methane, as identified by the flame ionization detector, and the presence of argon, as identified by the "GAS-A-PHON" in the same test area, ensures that a leak in the conduit is present at the test location. Therefore, only areas where a leak is present need be excavated for repair operation.

Other features and advantages of this invention will be apparent from the following detailed description, appended claims, and the accompanying drawing.

BRIEF DESCRIPTION OF THE DRAWING

FIG. 1 is a schematic view of a fragmentary portion of a conduit type piping system illustrating the use of the double tracer process of the present invention for locating conduit leaks.

FIG. 2 is a side elevation view of the conduit type piping system illustrated in FIG. 1, taken along the line 2—2 thereof, and looking in the direction of the arrows.

DESCRIPTION OF THE PREFERRED EMBODIMENT

Referring now to the drawing, and in particular to FIG. 1, the numeral 10 generally designates a carrier pipe for products such as steam, high temperature hot water, chilled water, hot oil and other products. The carrier pipe 10 is surrounded by suitable insulation material, and a protective conduit, generally indicated by the numeral 11. The carrier pipe 10, and its protective conduit 11 is illustrated as being disposed in an underground position in the ground 12, and the numeral 13 indicates the ground surface. The carrier pipe 10, and conduit 11, is indicated as being extended between two manholes 14 and 15, so that the ends of the carrier pipe 10 and the protective conduit 11 are accessible for inspection purposes. The numeral 16 designates the end cover plates or walls for the protective conduit 11. A pair of plugs 17 are mounted in each of the end cover walls 16 to allow access to the interior of the protective conduit 11.

In carrying out the process of the present invention, a supply tank 21 of the combination or mixture tracer gas is disposed adjacent one of the manholes on the ground surface 13. The supply tank 21 is provided with a conventional regulator valve 22, and a conduit or tracer supply gas hose 23 for conducting the combination tracer gas through a suitable port in one of the plugs 17 and into the interior of the sealed protective conduit 11.

A test hole 28 is drilled in the ground 12 down towards the carrier pipe 10 and protective conduit 11, in an area at which a suspected leak 27 is thought to be located. In carrying out the process of the present invention, the pickup hose or probe 29 of a suitable gas detecting apparatus, generally indicated by the numeral 24, is disposed in the test hole 28. The numeral 20 designates the electrical power plug for the gas detecting apparatus 24. The numeral 31 generally designates the argon gas leakage area into which the argon test gas would permeate the ground 12 when it escapes from the protective conduit 11 through the leak 27, which is the leak that the process of the present invention may be seeking to locate. Any suitable gas detecting unit for detecting argon gas may be used for carrying out the function of the gas detecting unit 24. A suitable gas detecting unit is one available on the market under the trademark "GAS-A-PHON," and it is manufactured by the Hermann Sewerin Company, 4830 Gutersloh 1, postfach 2940 BRD, West Germany. Said "GAS-A-PHON" is available in the United States from the North American sales agent for said Hermann Sewerin Company, which is Heath Consultants, Incorporated, 100 Tosca Drive, Stoughton, Mass. 02072.

The leakage area 34 in the ground 12 (FIG. 1) is the area in which the escaping methane tracer gas would permeate. The methane gas escaping into the atmosphere would be detected by any conventional portable flame ionization unit 25. The flame ionization unit 25 is provided with a suitable intake hose 36 and an intake cup or probe 35. Conventional flame ionization units are available from various sources as, for example, from Heath Consultants, Incorporated of 100 Tosca Drive, Stoughton, Massachusetts, 02072.

The double tracer gas in the supply tank 21 is a combination or mixture of about two and one-half (2½) to ten (10) percent methane and ninety (90) to ninety-seven and one-half (97½) percent argon, The methane-argon mixture is a non-combustible, non-toxic gas. Argon is an inert gas so that there is no danger due to combustion or toxicity. The methane is a lighter than air hydrocarbon which will rise to the surface through the area 34 indicated in FIG. 1, and vent to the atmosphere whereby it can be detected by the flame ionization 25 by means of its probe 35. The double tracer gas is inserted into the conduit 11 at a pressure of 10 PSIG.

Flame ionization detectors detect only hydrocarbons and have the capability of showing a full meter deflection in the presence of 10 parts of methane in one million parts of air, so that very small leaks may be detected. Conventional flame ionization detectors also have multiple ranges of sensitivity and may be desensitized to evaluate larger leaks.

The argon gas which escapes through the leak 27 into the area indicated by the numeral 31 over the top of the carrier pipe 11 is a heavier than air gas which is easily detected with the gas detecting unit 24. The aforementioned "GAS-A-PHON" instrument 24 has two chambers with a speaker, as well as a microphone at each end of the chambers. A tone is generated by the speakers, picked up by the microphones and the speed of sound transmission is monitored. One chamber is filled with air at atmospheric pressure, and the other chamber is filled with a sample from the sub-surface atmosphere from around the leaking conduit 11, by means of the intake hose 29 in the test hole 28. If argon is present in the sub-surface atmosphere in the test hole 28, a reading is noted on the instrument 24. As the heavier than argon is slow, the transmission of the tone in the test chamber can cause an imbalance in the detector circuit.

The presence of methane, as identified by the flame ionization detector 25, and the presence of argon as detected by the gas detecting unit 24 in the same test area, insures that a leak in the conduit 11 is present at the test location. Therefore, only areas where a leak is present need be excavated for repair.

While it will be apparent that the preferred embodiment of the invention herein disclosed is well calculated to achieve the results aforestated, it will be appreciated that the invention is susceptible to modification, variation and change.

What is claimed is:

1. A double tracer gas process for locating conduit leaks in a conduit, comprising the steps of:
    (a) inserting a double tracer gas comprising a mixture of a lighter than air gas which will rise to the surface from a leak in the conduit and be vented to the atmosphere, and a heavier than air gas which will escape from a leak in the conduit into the sub-surface atmosphere around the conduit;
    (b) detecting the leakage of the lighter than air hydrocarbon gas by a flame ionization detector; and,
    (c) detecting the leakage of the heavier than air gas by a gas detection means.

2. A double tracer gas process for locating conduit leaks in a conduit as defined in claim 1, wherein:
    (a) said lighter than air gas comprises methane gas; and,
    (b) said heavier than air gas comprises argon gas.

3. A double tracer gas process for locating conduit leaks in a conduit as defined in claim 2, wherein:
    (a) said double tracer gas comprises a mixture of about 2½% to 10% methane gas and about 90% to 97½% argon gas.

* * * * *

UNITED STATES PATENT AND TRADEMARK OFFICE
CERTIFICATE OF CORRECTION

PATENT NO. : 4,189,938
DATED : February 26, 1980
INVENTOR(S) : Paul M. Heim

It is certified that error appears in the above—identified patent and that said Letters Patent is hereby corrected as shown below:

Column 3, line 10, following "numeral", "20" should read -- 30 --.

Signed and Sealed this

Tenth Day of June 1980

[SEAL]

Attest:

SIDNEY A. DIAMOND

Attesting Officer    Commissioner of Patents and Trademarks